United States Patent [19]

Nordstrom

[11] Patent Number: 5,050,724
[45] Date of Patent: Sep. 24, 1991

[54] ROLL INFEED CONVEYOR

[75] Inventor: John E. Nordstrom, 2408 Jefferson St., Two Rivers, Wis. 54241

[73] Assignees: John E. Nordstrom; Barbara Ann Nordstrom, both of Two Rivers, Wis. ; a part interest

[21] Appl. No.: 588,246

[22] Filed: Sep. 26, 1990

[51] Int. Cl.[5] ............................................ B65G 47/24
[52] U.S. Cl. .................................. 198/407; 198/415; 198/419.3
[58] Field of Search ............... 198/406, 407, 408, 415, 198/419.3, 374, 463.3

[56] References Cited

U.S. PATENT DOCUMENTS

| | | | |
|---|---|---|---|
| 2,162,457 | 6/1939 | Laxo | 198/415 |
| 3,178,007 | 4/1965 | Standley et al. | 198/419.3 |
| 3,194,382 | 7/1965 | Nigrelli et al. | 198/419.3 X |
| 3,403,770 | 10/1968 | Boyce et al. | 198/415 |
| 3,403,771 | 10/1968 | Gardiner et al. | 198/415 |
| 3,640,375 | 2/1972 | Reimers | 198/415 |
| 3,682,292 | 8/1972 | Drew | 198/408 X |
| 4,564,104 | 1/1986 | Anderson | 198/419.3 X |

FOREIGN PATENT DOCUMENTS 0230414 9/1988 Japan .................. 198/407
2103168 2/1983 United Kingdom ............... 198/407

Primary Examiner—D. Glenn Dayoan
Attorney, Agent, or Firm—Wheeler Law Firm

[57] ABSTRACT

An infeed conveyor for a packaging machine holds a first squeezer conveyor having upper and lower belts spaced to receive workpiece rolls in an end to end relationship between them. The lower accelerating rollers and the upper accelerating rollers advancing the workpiece rolls further along the path of the first squeezer conveyor. At least one upper accelerating roller having a drive for driving it at a higher speed than the other accelerating rollers. A second conveyor being provided for receiving the workpiece rolls. The receiving end of the second conveyor either being at or below the level of the lower accelerating roller. When the receiving end of the second conveyor is below the level of the lower accelerating rollers the workpieces are rotated 90 degrees away from their original endwise advance by the action of the upper accelerating roller that has a drive for driving it at a higher speed than the other accelerating rollers. Flight bars rotating around with the second conveyor running faster than the second conveyor are provided to bunch the workpieces into abutting groups of a predetermined size for entry in packaging machine.

10 Claims, 2 Drawing Sheets

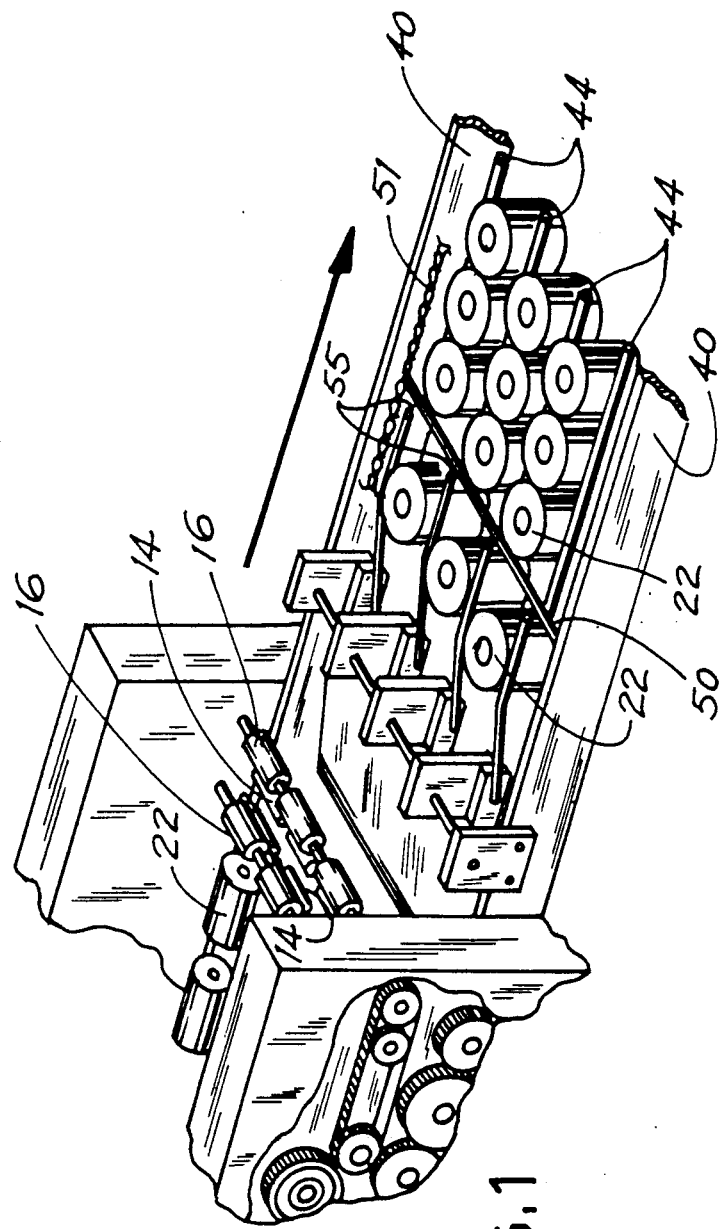
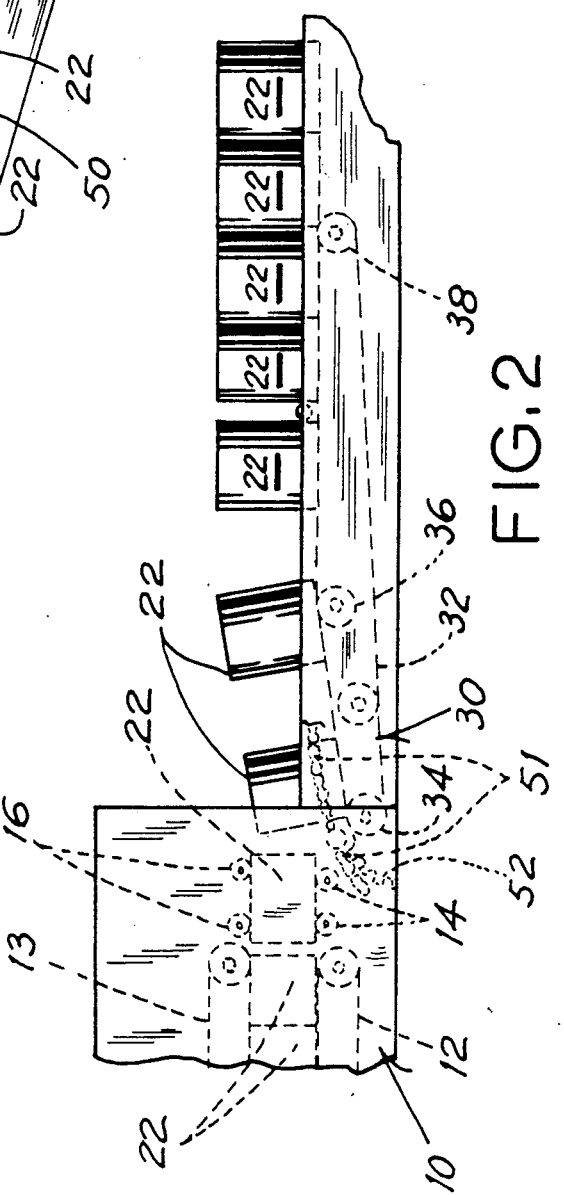
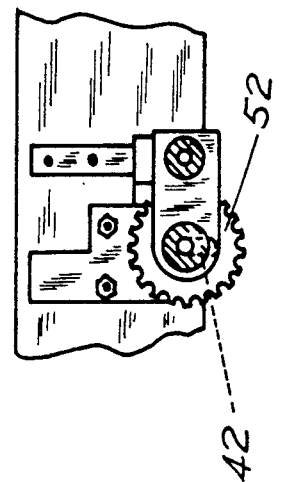

ROLL INFEED CONVEYOR

BACKGROUND OF THE INVENTION

In the past, packaging machines for rolls of paper such as bathroom tissue and kitchen towels have fed the respective rolls or workpieces into the packaging machine in a direction which is axial with respect to the cylindrical rolls of paper. In Europe, on the other hand, the rolls of paper are typically fed to packaging machines with the roll moving in a radial direction, resulting in a different style of package with the seal differently oriented with respect to the surfaces and the advertising material on the wrapping film.

Neither type of machine has been capable in the past of handling both types of orientation. It is an object of this invention to provide an infeed conveyor which can present rolls of paper to a packaging machine in either orientation so that the packaging machine becomes more flexible in producing whatever style of packaging is desired. It will be apparent from the details that follow that this objective is achieved by the present invention in a manner which not only makes the packaging machine more flexible, but does so in a way that minimizes the time required for changing from one packaging configuration to another so that the machines are more productive. Instead of replacing entire conveyor sections and changing the height of other sections to accommodate a large wheel capable of receiving paper rolls axially along its horizontal mid-line and then rotating to release the rolls ninety degrees later on a much higher or lower plane depending upon the application required, the present invention requires that only a segment of one conveyor be pivoted to a lower level to receive rolls that are being positively turned, after which the rolls are immediately restored to the original plane to be fed to the packaging machine. The conveyor remains in the same frame and minor adjustments are made to drive certain parts at different speeds so that the entire change-over can be made very quickly.

None of the prior art discloses the unique design of this invention. The prior art includes the Wrapmatic Multiwrap 20 manufactured by Wrapmatic SPA and the Cassoli PAC/910-R manufactured by Cassoli S.R.L.; both of Bologna, Italy.

SUMMARY OF THE INVENTION

The invention comprises a roll infeed conveyor, for infeeding workpieces, having a squeezer section, accelerating rollers located above and below the workpiece rolls leaving the squeezer section, and a bunching conveyor to receive the workpieces from the accelerating rollers and group them. The bunching conveyor comprises a wide conveyor belt having a smooth, slick surface, and a separate carrier, such as a sprocket and chain, for bars moving in generally the same path as the conveyor belt but a short distance above its surface and timed to move to a point above the upper surface of the conveyor belt just behind each group of workpieces which is to form a single group (typically two to four workpieces will be grouped). The bars move faster than the conveyor belt to an extent sufficient so that workpieces which come from the accelerating rollers with gaps between them are pushed together on the bunching conveyor to form a group with no space between the workpieces in the direction of advance. Typically guide bars are also provided to group the workpieces in the lateral direction as they advance although that feature is not new and not a part of the invention.

The bunching conveyor has an end which is nearest the squeezer conveyors which is pivoted to move a short distance from a position in which the upper run of the bunching conveyor is in the same plane as the upper run of the lower belt of the squeezer conveyor to a position in which the upper run of the bunching conveyor begins at a point lower than the upper run of the lower belt of the squeezer conveyor. The distance pivoted being greater than the axial length of a workpiece. The flight bars are similarly displaced so that they continue to follow a path parallel to the upper run of the bunching conveyor. This is accomplished by mounting the end roller of the bunching conveyor and the end sprockets of the flight bar carrier on moveable mountings which may be moved with respect to the frame of the machine.

When the upper run of the bunching conveyer is moved downward it is also necessary to change the gearing on the accelerating rolls so that the last upper accelerating roller has a greater surface speed than the remaining accelerating rollers. By increasing the speed of this roller, workpieces arriving at the speeded up accelerating roller have their upper surface accelerated more than their lower surface so that they pivot around the lower accelerating roll and are deposited on the bunching conveyor oriented ninety degrees from their original orientation. It is this feature which allows a slight speed change in the last upper accelerating roller and an elevation change in the bunching conveyor to accomplish rotation of the respective workpiece rolls ninety degrees so that they may be packaged in an alternate configuration without substantial machine changes.

DESCRIPTION OF THE DRAWINGS

FIG. 1 is a front side perspective view of the roll infeed conveyor of my invention.

FIG. 2 is a side elevational view showing the parts oriented for ninety degree rotation of the workpiece rolls.

FIG. 7 is a cross sectional view at the far side of conveyor 32 showing the moveable mounting for roller 34 and the flight bar conveyor.

DETAILED DESCRIPTION

Figure 3:
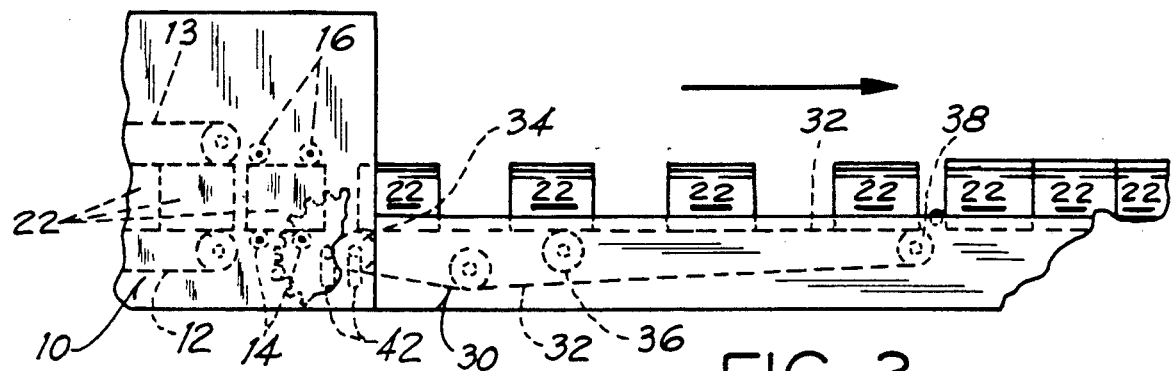
FIG. 3 is a side elevational view showing the parts oriented for axial feed of the workpiece rolls.

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

In the invention there is a first conveyor section 10 consisting of a lower conveyor belt 12 and upper conveyor belt 13 between which workpiece rolls 22 are conveyed. The illustration shown is of bathroom tissue rolls traveling in an axial direction touching end to end while being confined between conveyor 12 and 13. The distance between conveyor 12 and 13 is less than the diameter of each workpiece roll. Conveyors 12 and 13 together form the squeezer conveyor or first infeed conveyor 10. At the output end of conveyor 10 a number of conveying rollers, hereafter acceleration rollers 14 and 16, rotating at a higher speed than the surface speed of the belts 12 and 13 are located. Acceleration rollers 14 lie in the same plane as belt 12 but rotate at a much higher surface speed. Acceleration rollers 16 lie in the same plane as belt 13 and rotate at the same speed as that of acceleration rollers 14. Squeezer conveyor 10 is adjusted to deliver these rolls 22 axially to a packaging machine as will be discussed later.

Referring to FIGS. 2-6, conveyor 30 may be seen. Conveyor 30 receives the workpiece rolls 22 that have been deposited on it by the squeezer conveyor 10. The workpieces are deposited in separate units upon the conveyor 30. The conveyor 30 consists of very slick low friction belt material 32 and a flight bar conveyor. Flight bars 50 ride on a conventional chain 51 that rides on a sprocket 52. The flight bars 50 are positioned around the belt 32 and travel at a higher speed than the belt 32 so as to group the separated workpiece rolls 22 together. Flight bars 50 are timed to pass over end 34 of conveyor 30 in order to group together a predetermined number of workpiece rolls 22 that have been deposited on the conveyor belt 32. Accordingly, the flight bars 50 are moving faster than belt 32 so that the workpieces can be grouped and in contact with one another before they are fed into the packaging machine. Guides 44 maintain the workpiece rolls 22 lateral position on the conveyor belt 32. Also the flight bars 50 are initially travelling under the guides 44 as they come up over end 34 of the conveyor 30 but they then pass through a gap 55, illustrated in FIG. 1, and push the grouped workpieces 22 to the packaging machine while travelling over the top of the guide bars 44; it should be noted that the flight bars 50 rise over the guide bars 44 because the guide bars 44 located after the gap 55 are lower and closer to the conveyor belt 32 than are the guide bars 44 that are located before the gap 55. When the conveyor 30 is to be adjusted to feed workpiece rolls 22 into the packaging machine with rolls oriented so that the axis points up rather than forward (i.e. vertical rather than horizontal) the necessary adjustments may be accomplished in a few simple steps.

The adjustment is accomplished as follows: Table roller 34 is moveable, sprockets 52 are moveable, support gibs 42 are secured to the main side frame 40 for the second conveyor 30 as well as to center roller 36. Center roller 36 acts as the general pivot point about which the moveable roller 34 and sprocket; 52 pivot; both the moveable roller 34 and the sprocket; 52 are individually adjustable on separate gibs 42. A fixed end roll 38 is located at the other end of the conveyor 30. Conveyor 30 is to be adjusted for feeding vertically oriented workpieces to the packaging machine. The sprocket 52 and the roller 34 are moved to the lower position that is shown in all figures with the exception of FIG. 3 which shows the upper position. Accordingly, now both the conveyor belt 30 and the flight bars 50 are in proper position to move the tipped workpieces 22.

Figure 4:
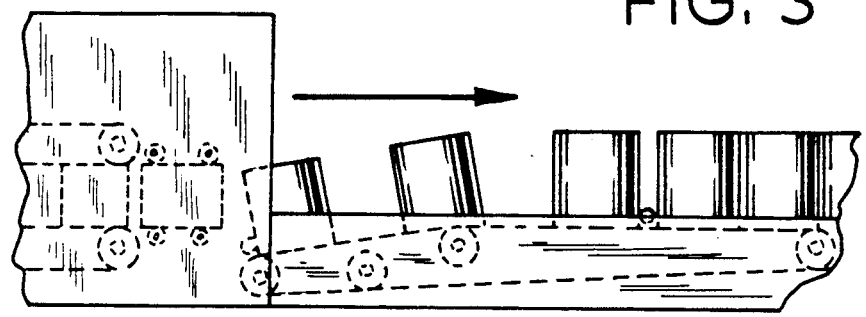
FIG. 4 is a side elevational view.
Figure 5:
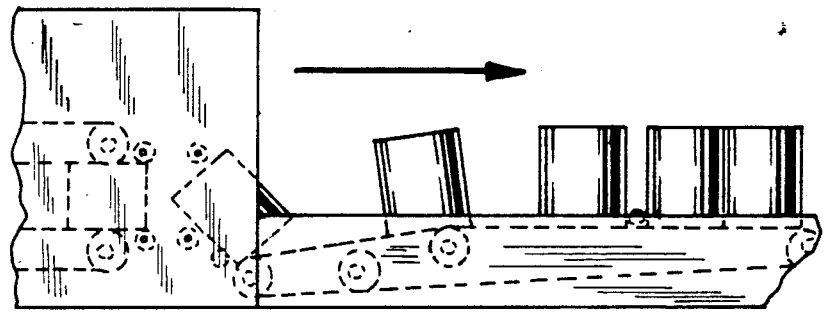
FIG. 5 is a side elevational view.
Figure 6:
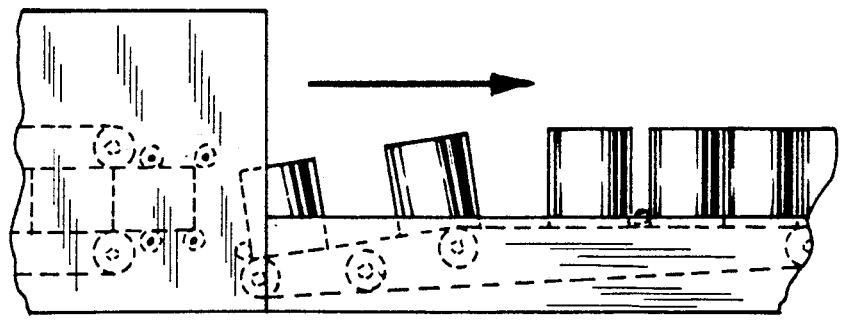
FIG. 6 is a side elevational view.

In addition to adjusting conveyor 30 so that the end is at a lower position to receive rotated workpiece rolls 22 and the flight bars 50 are moved to proper position, it is necessary to adjust the speed of the last upper acceleration roller 16 to a higher speed than the remaining acceleration rollers. Preferably the speed of this acceleration rollers, which is the farthest in the axial direction from conveyor 13, is twice the speed of the other acceleration rollers. This may be done with a different timing belt drive sprocket or by inserting a gear reduction in the drive as shown in FIG. 1. It will be noted that the last lower acceleration roller 14 in the axial direction away from conveyor 12 is not as far from conveyor 12 as the last acceleration roller 16 is from conveyor 13 so that the increased speed of the last roller 16 causes the workpieces 22 to roll about the last roller 14; turning the workpieces 22 90 degrees as they are deposited on conveyor belt 32. FIGS. 4, 5, and 6 illustrate this action. It should be noted that the workpieces 22 are resilient and can be deformed and quickly recover their original shape after deformation.

FIG. 7 shows the support gib 42 for conveyor roller 34.

Thus by moving both roller 34 and sprockets 52 up and down with respect to frame 40 and by changing the speed of end acceleration roller 16 the workpieces 22 are caused to be deposited on belt 32 in an orientation 90 degrees from their original orientation with very little lost machine time.

The above described embodiments of this invention are merely descriptive of its principles and are not to be limited. The scope of this invention instead shall be determined from the scope of the following claims, including their equivalents.

What is claimed is:

1. A device for moving workpieces in a conveyor system comprising:
   a first conveyor which advances the workpieces in axial end to end contact;
   a plurality of upper accelerating rollers;
   a plurality of lower accelerating rollers;
   a second conveyor comprising a belt supported on at least one set of moveable rollers with a first vertically moveable roller, a second median roller, and a third end roller;
   a frame supporting the first vertically moveable roller;
   the first vertically moveable roller being pivotable about an axis generally central with the second median roller and driving means for driving at least one of the plurality of said upper accelerating rollers at a rate faster than the remaining said upper and lower accelerating rollers;
   whereby the first vertically moveable roller of the second conveyor may be moved to a position generally below the plane of the plurality of lower accelerating rollers and at least one upper accelerating roller is driven at a rate faster than the remaining upper and lower accelerating rollers to successive work pieces so that the workpieces on the first conveyor are turned 90 degrees and deposited on the second conveyor.

2. The device of claim 1 in which the second conveyor has a low friction surface, and bunching means associated with the second conveyor to assemble the work pieces on the second conveyor into groups of touching workpieces of a predetermined size.

3. The device of claim 1 having a plurality of upper and lower accelerating rollers in which the last upper accelerating roller, capable of being driven faster than the remaining accelerating rollers, is positioned further from the first conveyor, in a direction in which the workpiece rolls are moving, than the last lower accelerating roller.

4. The device of claim 2 in which the bunching means comprises a flight bar conveyor operating around with the second conveyor;

the respective flight bars of the flight bar conveyor being timed to travel over the second conveyor at intervals between the intervals at which a predetermined number of workpieces arrive and to travel faster than the second conveyor whereby to bunch the workpieces into abutting groups.

5. The device of claim 1 in which first conveyor comprises of upper and lower conveyor belts that are separate from one another and receive the workpieces in an abutting relationship.

6. The device of claim 5 in which the upper accelerating roller is further along the path of the advancing workpieces than the lower accelerating roller.

7. A method of turning workpieces on an infeed conveyor consisting of a linear series of a first conveyor and a second conveyor, said conveyors each comprising means to move workpieces in an axial direction, said first conveyor, including at least one upper and at least one lower accelerating roller, said method comprising the following steps:

first, adjusting the end of the second conveyor to a lowered position with respect to the accelerating rollers for receiving the turned workpieces;

second, positioning the lower accelerating roller in the axial direction followed by workpieces leaving said first conveyor and before said workpieces reach said second conveyor, said lower accelerating roller being spaced from said first conveyor a distance less than the axial length of the workpieces;

third, adjusting the speed of at least one upper accelerating roller to a speed faster than the speed of any of the other upper and lower accelerating rollers to tip a workpiece onto the second conveyor.

8. The method of claim 7 in which the workpiece is tipped at least 90 degrees away from its original orientation and onto the second conveyor.

9. A device for moving workpieces in a conveyor system comprising:

a first conveyor which advances the workpieces in axial end to end contact;

a plurality of upper accelerating rollers;

a plurality of lower accelerating rollers;

a second conveyor comprising a belt supported on at least one set of moveable rollers with a first vertically moveable roller, a second median roller, and a third end roller;

a vertically moveable frame rotatably supporting the first vertically moveable roller;

the vertically moveable frame being pivotable about an axis generally concentric with the second median roller, and driving means for driving at least one said upper accelerating roller at a rate faster than the remaining said accelerating rollers;

whereby the first roller of the second conveyor may be moved to a position generally below the plane of the lower accelerating rollers and at least one upper accelerating roller may be driven at a rate faster than the remaining accelerating rollers so that the workpieces on the first conveyor are turned 90 degrees and deposited on the second conveyor;

the second conveyor having a low friction surface, and bunching means to assemble the work pieces on the second conveyor into groups of touching workpieces of a predetermined size.

10. A device for moving workpieces in a conveyor system comprising:

a first conveyor which advances the workpieces in axial end to end contact;

at least one upper accelerating roller;

at least one lower accelerating roller;

a second conveyor comprising a belt supported on at least one set of moveable rollers with a first vertically moveable roller, a second median roller, and a third end roller;

a vertically moveable frame supporting the first vertically moveable roller;

the first vertically moveable frame being pivotable about an axis generally concentric with the second median roller and driving means for driving at least one said upper accelerating roller at a rate faster than the remaining said accelerating rollers;

whereby the first roller of the second conveyor may be moved to a position generally below the plane of the lower accelerating rollers and at least one upper accelerating roller is driven at a rate faster than the remaining accelerating rollers so that the workpieces on the first conveyor are turned 90 degrees and deposited on the second conveyor;

the second conveyor having a low friction surface, and bunching means to assemble the work pieces on the second conveyor into groups of touching workpieces of a predetermined size;

the bunching means including a flight bar conveyor orbiting around the second conveyor;

the respective flight bars of the flight bar conveyor being timed to travel over the second conveyor at intervals between the intervals at which a predetermined number of workpieces arrive and to travel faster than the second conveyor whereby to bunch the workpieces into abutting groups.

* * * * *